United States Patent [19]

Thomas

[11] 4,093,903

[45] June 6, 1978

[54] APPARATUS FOR EXTENDING THE LINEAR SIGNAL RANGE OF A ROTARY TRANSFORMER TYPE DEVICE

[75] Inventor: Ronald E. Thomas, Phoenix, Ariz.

[73] Assignee: Sperry Rand Corporation, New York, N.Y.

[21] Appl. No.: 764,327

[22] Filed: Jan. 31, 1977

[51] Int. Cl.² .............................................. B64C 13/18
[52] U.S. Cl. .................................... 318/584; 318/595; 318/654; 244/180
[58] Field of Search ............... 318/595, 654, 661, 584; 340/347 SY; 244/180

[56] References Cited

U.S. PATENT DOCUMENTS

| 3,701,936 | 10/1972 | Martin et al. ..................... 318/654 X |
| 4,011,440 | 3/1977 | Steglich ............................. 318/654 X |

Primary Examiner—B. Dobeck
Attorney, Agent, or Firm—Howard P. Terry; Albert P. Cefalo

[57] ABSTRACT

The linear signal output range of a rotary transformer type device, such as a sine/cosine synchro, is considerably extended beyond its normal 45° linear range by electronic circuit means. Specifically, the electronic circuit means utilizes the sine signal, which is generally linear from 0° to 45°, as a portion of the output signal and utilizes a resultant signal computed from the cosine signal, which is linear from 45° to approximately 135° for the remaining portion of the output signal.

12 Claims, 4 Drawing Figures

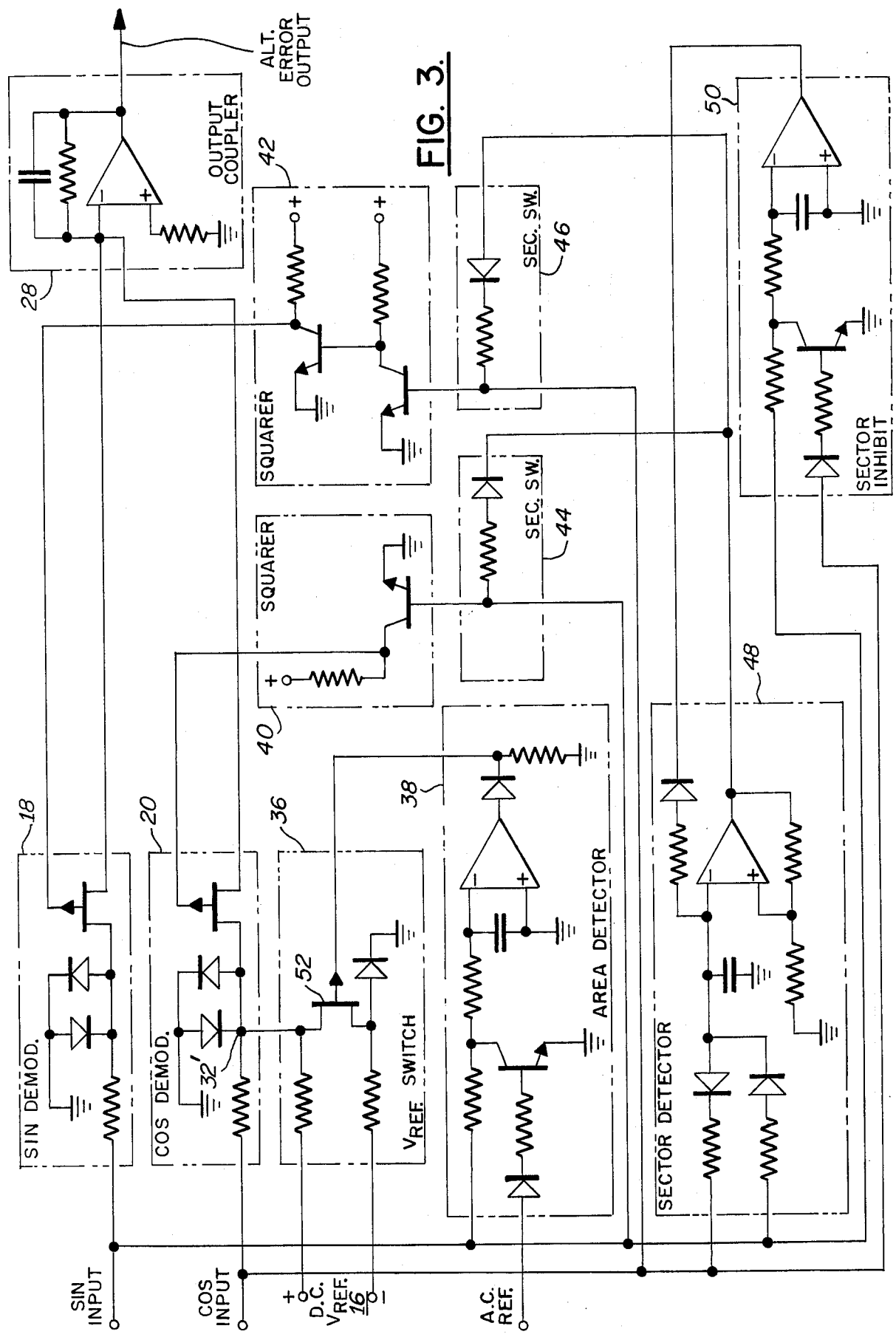

APPARATUS FOR EXTENDING THE LINEAR SIGNAL RANGE OF A ROTARY TRANSFORMER TYPE DEVICE

BACKGROUND OF THE INVENTION

1. Field of the Invention

This invention relates to control systems embodying electrical synchro signal data and, more particularly, to means for extending the linear range of the synchro angle signal information for use in control systems requiring extended control signal linearity.

2. Description of the Prior Art

In general, the control signal output of a conventional synchro device has a sinusoidal waveform which is quite linear over a limited range of about ±45° but which becomes nonlinear from ±45° to ±135°. In aircraft systems, for example, the signal output of a conventional synchro is a 400 Hz carrier, the amplitude of which is modulated sinusoidally as the synchro rotor is rotated relative to the stator. Usually, this modulated 400 Hz signal is demodulated to provide a d.c. signal sinusoidally varying as a function of rotor position. In many applications only the ±45° linear range of the synchro is used. However, in some applications it is desired to extend the linear range of the synchro output substantially beyond its normal linear range.

In the past, many techniques have been used for extending the linear range of synchro type devices. One early technique was to alter the stator and/or rotor winding distribution which proved not to be cost effective. Other techniques have been electronic, that is, by operating on the synchro output signal itself, such as by using diode/resistance networks, non-linear operational amplifiers and the like. These too have suffered from high cost and reliability problems. In U.S. Pat. No. 3,701,936, which issued on Oct. 31, 1972 to Martin et al., a composite function for extending the linear range of the sinusoidal waveform uses the function $1 + \cos \theta - \sin \theta$ where $\theta$ is synchro rotor angle.

In one application of the present invention (although not limited thereto), an extended linear range of a synchro output is most beneficial; that is, in an altitude preselect system for an aircraft flight control and/or flight director system. In such a system the present invention makes use of the sine and cosine signals from a settable synchro resolver which are indicative of altitude error, i.e. signals representative of the difference between the aircraft's existing altitude and a desired or selectable altitude, which error signal is used to cause the craft to execute an asymptotic capture of the selected altitude. For example, a pilot may select a desired altitude above or below his present altitude and establish a desired rate of ascent or descent thereto and then engage an altitude capture mode to effect the desired change in altitude and perform an asymptotic altitude capture maneuver. Automatic altitude capture limits, however, are based to a great extent on the range of linearity of the altitude error signal and the altitude rate established by the pilot. Typically, the settable altitude error is responsive to the "fine" altitude synchro output of the aircraft's air data computer which generally has a fine resolution of 5,000 feet per synchro revolution and normally would produce a substantially linear signal only over the range of plus or minus 45° synchro rotation or approximately plus or minus 625 feet of altitude change. Thus, the altitude capture maneuver must be initiated at this altitude error or even below 500 feet due to tolerance build up from the desired altitude in order to use the desirable linear altitude error signal. This limited linear altitude range may not be sufficient to accomplish an altitude capture with no overshoot. For example, if a high rate of ascent or descent is established by the pilot, the 500 foot threshold of the fine altitude error synchro does not provide sufficient time, or altitude error, for the aircraft to safely pull out or push over to accomplish the asymptotic capture and an undesired overshoot results. Thus, it is desirable that the linear range of the fine synchro altitude error signal significantly be extended such that a substantial increase in the altitude capture threshold is provided to accommodate high rates of change of altitude of modern aircraft and still assure an asymptotic altitude capture.

As stated above, the prior art devices require complex relatively expensive circuits that are sometimes temperature dependent and difficult to troubleshoot, and may include external a.c. reference signals which can introduce phase shifts in the synchro output signal and non-linearity of the signal at 0° which, in turn, may introduce system inaccuracies.

Accordingly, there is a need to provide a simple, inexpensive and reliable means to electronically extend the linear signal range of a conventional resolver type device.

SUMMARY OF THE INVENTION

According to the invention, an electronic circuit means is employed for extending the linear range of the control signal output of a rotary transformer type device, such as a synchro control transformer. In such a device, as the rotor is rotated through ±180° the sine signal is substantially linear between 0° and ±45° and between ±135° and ±180° while the cosine signal is substantially linear between ±45° and ±135°. Specifically, the apparatus of the present invention essentially substitutes the linear portion of the cosine signal for the non-linear portion of the sine signal for the above-indicated linear rotor positions. For example, as the sine increases beyond ±45° the sine signal tends to become nonlinear while at the same time the cosine signal tends to become linear but in a sense negative to the sine. At this point then, the cosine signal is effectively inverted so that it linearly increases with increased rotor rotation. This inversion is accomplished by a bias signal being added to the cosine signal, which is twice the value of the cosine ±45°, and subtracting the actual cosine signal from the bias. The resultant linear signal is then substituted for the sine signal for all angular positions of the rotor greater than ±45°. The output control signal of this invention is, therefore, a substantially linear output signal between 0° and ±135°, one portion being the sine signal and the remaining portion being a biased cosine signal, which is useful up to ±180° depending upon the linearity requirements of the using equipment.

More specifically, the apparatus of this invention includes an electronic circuit responsive to both the sine and cosine signals of a synchro resolver device for extending the linear range of the sine signal, which is used as the control signal, which comprises means for providing a predetermined constant bias signal, means for subtracting the cosine signal from the constant signal forming a resultant signal and means for substituting the resultant signal for the non-linear portion of the sine signal, i.e., from the position where the sine and cosine signals are substantially equal to 180°. Moreover, amplitude and sense detecting circuits responsive to the raw sine and cosine signals are used for performing the switching functions for rotation of the synchro rotor in either direction.

Various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

FIG. 3 is a schematic wiring diagram of the preferred embodiment of the invention.

DETAILED DESCRIPTION OF THE PREFERRED EMBODIMENT

For a more complete appreciation of the invention, attention is invited to the following description of the invention, as shown in the attached drawings.

Figure 1:
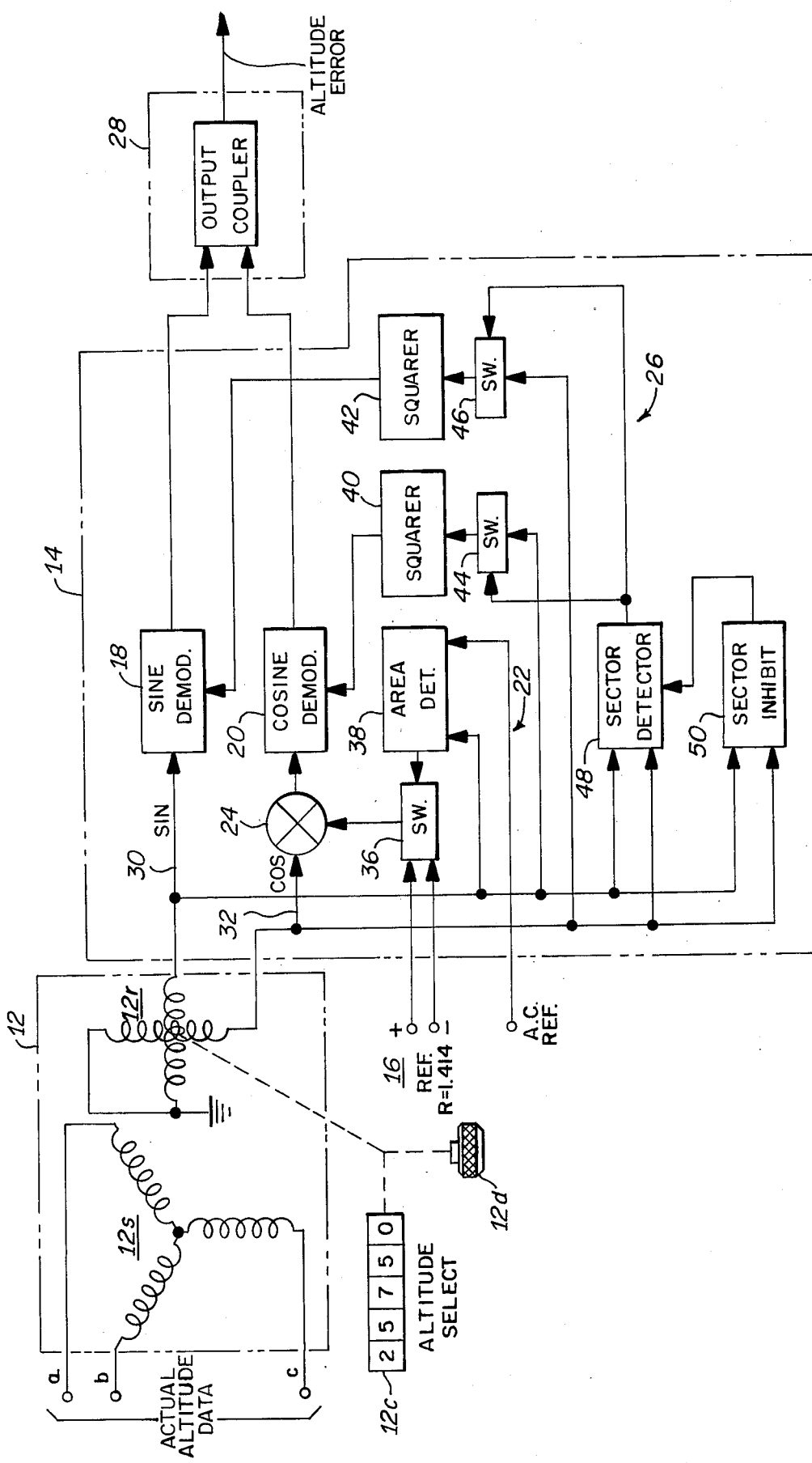
FIG. 1 is a functional block diagram of the apparatus of a preferred embodiment of the present invention.

Referring to FIG. 1, the preferred embodiment of the present invention is illustrated as applicable in an altitude preselect system for an aircraft control system, wherein a manually settable synchro resolver control transformer 12, with a suitable counter 12c, is employed to generate an altitude error signal. The altitude error signal is proportional to the difference between the aircraft's actual altitude and a desired or selected altitude and is a function of the angular position of the synchro rotor 12r relative to the synchro stator 12s. The synchro stator 12s receives actual altitude data in conventional three-wire synchro format (a,b,c) from the aircraft's air data computer (not shown). As the aircraft approaches the desired altitude selected by an altitude select 12d, the altitude preselect system's error signal varies accordingly (desirably in a linear manner) and when this signal, as represented by the electrical vector angular position of the synchro stator 12s, equals or is aligned with the selected position of the synchro rotor 12r (the sine winding thereof), the error signal goes to zero. In the present synchro, both the sine and the cosine windings are wound on the synchro rotor 12r and the "zero position" is the zero output signal position of the sine winding. It will be understood that the above-described embodiment is but one of many which may use the principles of the present invention in its broader aspects, that is, it may be embodied in any synchro type sine/cosine device wherein it is desired to extend the linear output range of the synchro's sine output signal (or vice versa).

The extended range altitude error linearizing apparatus or electronic control circuit means 14 of this invention is coupled to the rotary transformer type device or synchro 12, and more particularly, is coupled to the sine 30 and cosine 32 signals thereof and to a reference signal means or source 16 which supplies a predetermined d.c. reference signal or bias of appropriate sign, to be selected as described herein. The apparatus 14 includes a sine and a cosine demodulator 18, 20 coupled to the sine 30 and cosine 32 signals, respectively, of the synchro 12, means 22 for selectively switching the reference signal from source 16 to the appropriate sign for summing the appropriate polarity of the reference signal with the cosine signal in a summing means 24 and means 26 coupled to the sine and cosine signals of the synchro 12 to selectively switch and provide reference signals to the demodulators 18 and 20, as described herein, to apply the appropriate sine or cosine signal to an output coupler 28 for providing an altitude error signal of extended linear range.

Figure 2A:
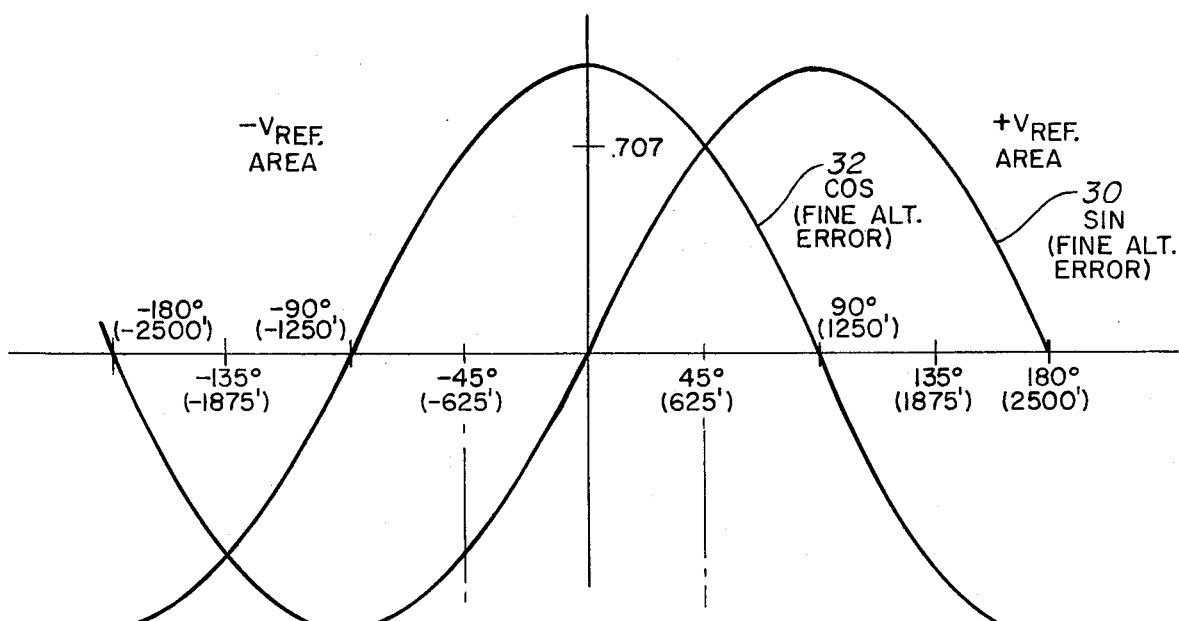
FIGS. 2a and 2b are graphs useful in explaining the operation of the invention.
Figure 2B:
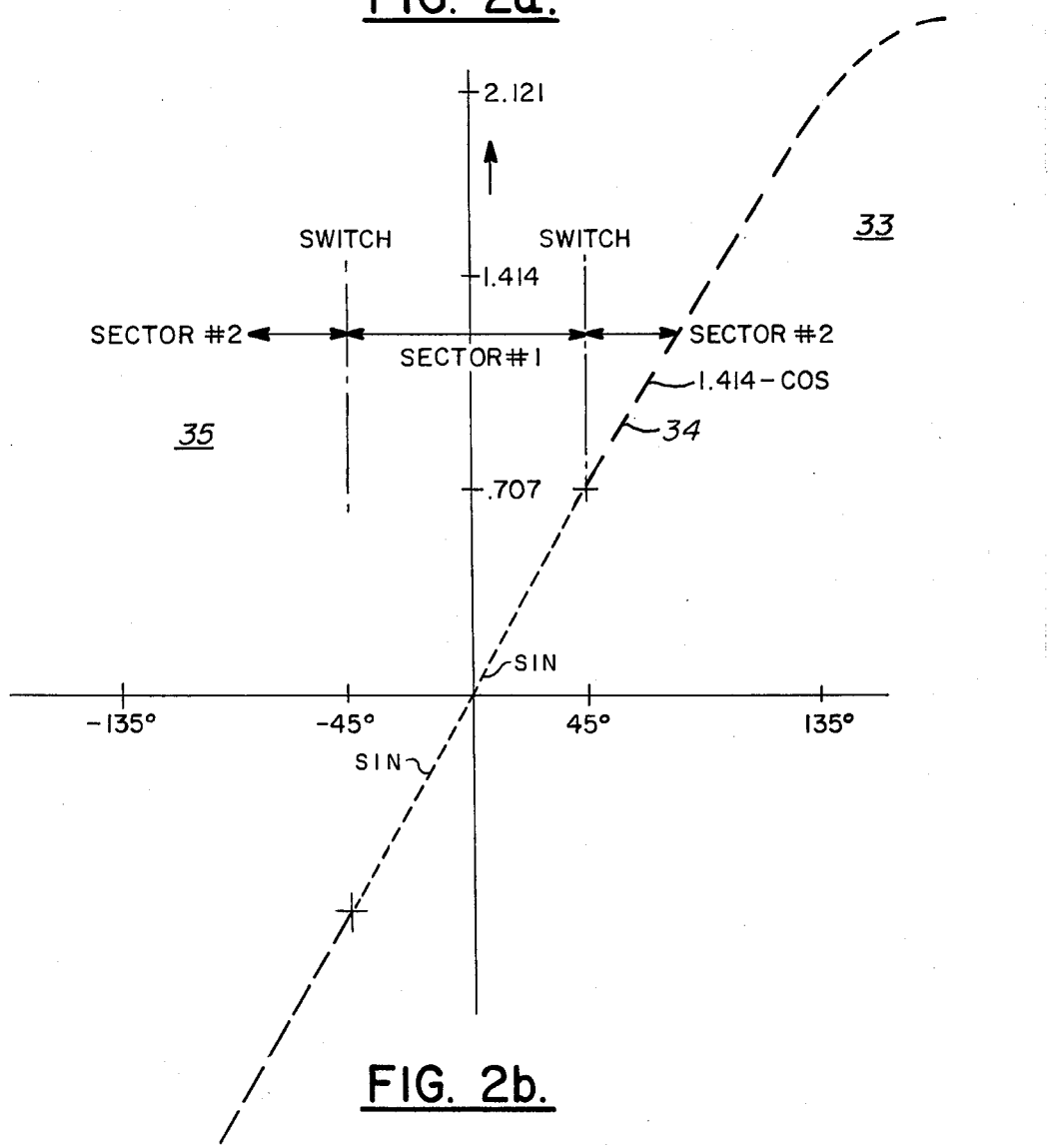

FIG. 2a illustrates in a graphical representation the variation of the sine and cosine signals 30, 32, respectively, of a synchro resolver rotor 12r with angular displacement as a function of the altitude error in feet. The scaling factor for the sine and cosine functions of FIG. 2a is 5,000 feet of altitude error for one complete revolution (−180° to +180°) of the synchro rotor 12r corresponding to increasing and decreasing altitude error selection, i.e., ± 2500 feet (0° to 180°) respectively. It should be noted that synchro 12 receives the above identified "fine" synchro data from the air data computer, and the "coarse" data, i.e. typically − 1200 feet to +60,000 feet is not shown nor is it pertinent to the present embodiment of the invention. In addition, a linearized altitude error output signal 34 provided by this invention is shown in FIG. 2b for both above or below altitude selection that is descending and ascending nodes of operation. In practice, the altitude selector may be set to any desired altitude and for altitude errors greater than the ±2,500 ft. range of the fine synchro, conventional "fine/coarse" switching circuits will inhibit the "fine" error until the actual altitude comes within the "fine" altitude range. Accordingly, the sine and cosine signals 30, 32 and the desired linearized altitude error signal 34 will generally be initiated at an angle somewhat below or above 2,500 feet or ±180° rotation of rotor 12r. For altitude errors of about ±2000 feet the apparatus of this invention will provide a substantially linear altitude error signal.

As shown in FIG. 2b, the linearized d.c. altitude error signal 34 is separated into two areas; area #1 33 and area #2 35 for both plus and minus, descent and ascent, synchro rotation or altitude errors, each being separated into two sections; sector #1 and sector #2. The sector #1 portion illustrates the conventional linear sine output of the rotor 12r between −45° and +45° angular (rotor) position. Moreover, the righthand portion of sector #2 of the altitude error "output" signal 34 is a resultant signal computed from the cosine signal and a predetermined constant d.c. bias signal, corresponding to twice the value of the amplitude of the sine (or cosine) signal at ±45°, i.e. 1.414, from which the cosine signal has been subtracted, whereas in the left hand portion of sector #2 the polarity of the constant bias signal is reversed and the cosine signal is added to the bias signal to accommodate the reversed sign of the sine signal. Thus, by inhibiting the sine signal for rotor positions, $\theta$, greater than ±45° and substituting therefore the resultant signal, $\pm 1.414 \mp \cos \theta$, the linear error signal of the sine output of the synchro 12 is extended by the resultant signal to a substantially linear range to ±135° corresponding to ±1875 feet. Accordingly, as shown in FIG. 2a, in the descent or ascent mode of operation, at about ±135°, that is, near the maximum "fine" altitude error capability of this embodiment, the error signal is $\pm 1.414 \pm \cos 135°$, and as the altitude error is reduced the signal error 34 is linearly reduced since the cosine signal 32 is substantially linear in the range of angular rotation of ±135° to ±45°. At ±45° the sine and cosine become equal whereupon the resultant, bias and cosine function, signal is inhibited and the sine 30 function is substituted therefor. Continued reduction of the altitude error produces a corresponding substantially linear reduction of the error signal according to the sine 30 function from ±45° to 0°.

Referring again to FIG. 1, the apparatus or electronic control means 14 provides the function described above and is connected to receive the sine 30 and cosine 32 signals from the synchro 12 and the reference source means 16. The control means 14 includes summing means 24 for summing the appropriate polarity of the reference signal (for ascent or descent) with the cosine signal 32 as determined by a polarity switch 36 as required. The sine and cosine signals from the resolver or generator 12 are typically 400 Hz carrier signals amplitude modulated in accordance with the angular position of the sine and cosine windings of the resolver rotor 12r. The sinusoidal signals are respectively coupled to the sine and the cosine demodulator 18 and 20 of the control means 14 to produce corresponding d.c. signals proportional to the sine and cosine functions of rotor position. In order to produce an extended linear signal according to this invention, the resultant signal for sector #2 of both areas #33 and #2 35 requires the summation of the cosine signal with the bias signal as indicated above. However, in area #1 33, the cosine signal 32 increases from a maximum negative value, e.g. 1.0 at 180° (FIG. 2a) to a positive value of 0.707 at 45° and, therefore, in order to provide a decreasing error signal 34 (FIG. 2b) from 180° to 0°, the cosine signal must be subtracted from the positive bias signal. In area #2 35, however, the cosine signal 32 must be added to a negative bias signal in order to provide this portion of the linear error signal 34. Accordingly, in order that the cosine demodulator 20 provides the appropriate resultant signal, the demodulator referencce signal is phased, as described below, so that only the negative half cycle of the modulated cosine signal is passed in area 1 33, and only the positive half cycle of the modulated cosine signal is passed in area number 2 35. The control means 14 further includes an area detector 38 which determines the proper sense of the d.c. reference signal for selected positive or negative rotation of synchro rotor 12r, that is, for area #1 or #2 33,35 or selected altitudes above or below the present altitude of the aircraft. The switch 36 is responsive to the sine signal 30 from rotor 12r and more particularly, is coupled to and responsive to the area detector 38 to determine the proper polarity of the reference signal from reference means 16. For example, for an in-phase sine signal, are #1 33 descent, the d.c.reference signal is positive and vice versa.

Further, and in accordance with the teaching of the present invention, no external a.c. reference signal, e.g. 400 Hz is used in the control means 14 for the sine and cosine demodulators 18 and 20 but rather the 400 Hz sine 30 and cosine 32 signals of the device 12 themselves are used for this purpose. That is, the 400 Hz cosine signal 32 is used as the reference signal for the sine demodulator 18 and the 400 Hz sine signal is used as the reference signal for the cosine demodulator 20, phase reversed compared to the sine. This technique by which the sine and cosine signals are used for cosine and sine demodulators, respectively, eliminates any phase shift problems normally associated with synchro-type devices because the demodulator references have undergone the same phase shift. To provide the 400 Hz demodulator reference signals, the raw sine and cosine signals from synchro rotor 12r are applied to respective squaring circuits 40 and 42, which provide amplitude independent 400 Hz reference signals for the cosine and sine demodulators 20 and 18, respectively, the cosine reference being 180° out of phase relative to the sine. Reference to thereby provide the required cosine polarity as explained herein. As will be described in more detail below, the demodulators 18 and 20 not only serve to demodulate the sine and cosine signals into corresponding d.c. signals, but also they effectively serve as switches for inhibiting these signals at the proper times, angular rotation position, during the operation of the apparatus. The switching function is performed by simply removing the reference signals from the demodulators 18 and 20 as by means of sector switches 44 and 46, respectively, which are polarity sensitive devices controlled by a sector detector 48.

As described above in connection with FIGS. 2a and 2b, the sine output is used as the system output signal in Sector #1, 0° to ±45°, and the biased cosine, or resultant, signal is used in the system output signal in Sector #2, ±45° to ±180°. Therefore, sector switching must occur at ±45° switching points (FIG. 2). Sector switching at the switching points is readily accomplished because at ±45° the sine and cosine are equal so that all that is needed is to sense this equality. As shown schematically in FIG. 1 the sector detector 48 compares the sine and cosine voltages and provides an output when their absolute values are substantially equal. Assuming an increasing value of the sine signal from 0° and a decreasing value of the cosine signal, the output of sector detector 48 will be of a polarity such as to maintain switch 46 closed and switch 44 open thereby allowing the sine signal 30 to be demodulated and passed on to the output coupler 18 as the system output while the cosine is inhibited. As the sine signal increases past ±45° and the cosine signal decreases, the polarity of the output of sector detector 48 reverses, turning off switch 46 and turning on switch 44 and hence inhibiting the sine signal and allowing the cosine signal, together with its d.c. constant reference, to be demodulated and coupled to the output coupler 18 as the system's output or error signal.

The apparatus 14 also includes a sector inhibit detector 50 responsive to one of the raw sine or cosine signals, preferably the cosine signal 32 for inhibiting the sector detector's 48 operation when the "fine" synchro 12 is outside of its "fine" range of operation.

Having generally described the overall structure of the apparatus of the present invention as schematically desclosed in FIG. 1, the structure and general operation of specific circuit arrangements for the various blocks of FIG. 1, will now be described, reference being made to FIG. 3. In general these circuits are conventional and their operation will be clearly evident to those skilled in the electronics arts.

The sine output of synchro rotor 12r is applied to a conventional P-channel FET-controlled demodulator 18, the diodes shown therein being for the purpose of protecting the FET from possible voltage spikes. The reference 400 Hz voltage for the demodulator 18 is obtained from a typical squarer circuit 42, responsive to the cosine output of the rotor 12r. The dual transistors are for the purpose of achieving the proper in-phase relation of the square wave reference for the sine demodulator 18. Similarly, the cosine output of the synchro rotor 12r is applied to an identical P-channel FET demodulator 20, the reference for which is derived from squarer 40 responsive to the sine output of the synchro rotor. However, the signal transistor provides a 180° out-of-phase square wave reference such that when the signals are in the $+V_{REF}$ area the negative half cycle of the cosine signal is passed thereby providing the negative cosine d.c. required for the relationship 1.414 − (cos $\theta$) of the invention. Conventionally, a P-channel FET conducts when its control electrode is grounded and is turned off when a positive voltage is present on its control electrode. Therefore, it is evident that the demodulators 18, 20 (when not inhibited) conduct every half cycle of the 400 Hz square wave allowing d.c. current to flow directly to the input of the operation current amplifier in the output coupler circuit 28. Resistive feedback around the op amp assures zero voltage at its input and an output proportional to the d.c. value of its input while the resistive/capacitive feedback provides filtering of the pulsating d.c. input. The resultant output of the op amp is a d.c. voltage proportional to the average value of its d.c. input current. It will be noted that the 400 Hz reference for the sine demodulator 18 is derived from the cosine synchro output 32 and that the reference for the cosine demodulator 20 is derived from the sine synchro output 30. Furthermore, as mentioned above, since the demodulator references are derived from the synchro output signals there are no phase shifts introduced into the demodulated signals which would be the case if an external 400 Hz reference was employed due to the inherent substantial phase shift characteristics of a synchro device.

The sector detector 48 comprises a circuit for comparing the absolute values of the raw sine and cosine signals 30, 32 from the synchro rotor 12r and provide a positive or negative output at essentially the instant one exceeds or becomes less than the other by a very small amount; i.e. when the two signals are substantially equal. This is accomplished by rectifying each of the signals, summing them and applying their difference to a very high gain operational amplifier operating as a switch.

The area detector 38 determines the polarity of the cosine bias signal from d.c. reference source 16. This circuit simply inspects the d.c. value of the sine signal from the synchro rotor 12r by means of a demodulator excited by a 400 Hz reference voltage. When the sine is positive the bias reference will be of one polarity and when negative it will be of the other polarity. This is accomplished by a combination of area detector 38 and $V_{REF}$ switch 36. The latter is a circuit supplied with equal positive and negative d.c. reference voltages proportional to twice the value of the sine or cosine signal at 45° (k), in this embodiment $k = 1.414$, from supply 16. The positive reference voltage is supplied directly to the summing junction 321 through a resistance of 2R value. The negative reference voltage is supplied to the summing junction 321 through a resistance 2R and a FET switch 52, the latter responsive to the output of area detector 38. It is apparent that two FET switches could be used but two resistors are more economical than two FETs. The output of the area detector 38 is applied to a diode which provides a positive voltage to FET 52 when the sine signal is positive thereby causing the positive reference voltage to be applied to the summing junction 321 and a zero voltage when the sine is negative thereby causing the negative reference voltage and be applied to summing junction 321.

The sector inhibit detector 50 is similar to the area detector 38 and inspects the cosine output of synchro rotor 12r which is demodulated by the sine output to provide a d.c. signal. When this d.c. signal goes negative, i.e., cosine greater than ±90°, the negative output voltage of detector 50 saturates the op amp of the sector detector 48 and prevents further sector switching which would otherwise occur when the "fine" synchro 12 operates beyond its "fine" range.

Although in actual use, the altitude error is normally reduced to zero from the actual altitude to a selected altitude, the invention may be more clearly explained by considering an increase in the error signal from zero to a large value corresponding to an increasing sinusoidal function from, e.g., 0° to 180°. Thus from 0° to +45° the sine signal starts at zero and substantially linearly increases whereas the cosine signal starts at a maximum and non-linearly decreases. During this sector, i.e. sector #1, sector detector 48 provides a persistent negative output which effectively disables the cosine demodulator 20 through switch 40 and enables the sine demodulator 18 whereby the cosine reference voltage from squarer 42 demodulates the sine signal to provide a d.c. sine signal increasing linearly towards +45° coupled to the output coupler 28 as an altitude error signal. At +45° the sine signal equals the cosine signal and immediately upon the sine exceeding the cosine the output of the sector detector 48 reverses polarity disabling the sine demodulator 18 and enabling the cosine demodulator 20. It will be noted that with the given initial conditions, area detector 38 provides a positive voltage to the FET of the $V_{REF}$ switch 36 which opens the switch and permits the positive d.c. $V_{REF}$ to be supplied to the summing junction 32. As stated above, the value of $V_{REF}$ is 1.414 which value, less the value of the cosine 0.707 at 45°, is equal to the sine value 0.707 at 45°. That is the d.c. biased a.c. signal is demodulated by the out-of-phase a.c. reference from squarer 40 and the resultant d.c. signal which now has a value of 1.414-cos 45° or a value of 0.707, (the same as sine 45°), is passed on to the output signal means or coupler 18. As the error signal increases beyond 45°, the decreasing value of the cosine is subtacted from the constant 1.414 resulting in an effectively inverted cosine signal linearly increasing up to +135°. Thus, in accordance with the present invention the linearity of the error signal is effectively extended at least 90° beyond the normal 45° linearity of the sine signal alone. As the effective synchro rotation increases past +225° no sector switching is permitted through the operation of the sector inhibit 50.

As stated above, the foregoing description is the reverse to the normal operation of the extended range altitude error linearizing apparatus 14 of this invention since in the normal operation the large error is generated initially and is reduced towards zero by the aircraft's response to the error. The operation described herein nevertheless is identical but in reverse.

While the invention has been described in its preferred embodiments, it is to be understood that the words which have been used are words of description rather than limitation and that changes may be made within the purview of the appended claimes without departing from the true scope and spirit of the invention in its broader aspects.

I claim:

1. Apparatus for extending the linear range of a rotary transformer type device including polyphase stator windings and sine and cosine rotor windings comprising, means responsive to the signal of said sine winding for providing a first output signal proportional thereto between first and second predetermined values thereof, means for providing a predetermined constant reference signal, means responsive to the signal of said cosine winding and said constant reference signal for providing a resultant second output signal proportional to the combination thereof for values of said cosine signal in excess of said first and second predetermined values of said sine signal.

2. The apparatus as set forth in claim 1 wherein said predetermined reference signal has a value which is predetermined multiple of the value of said sine signal at said first and second predetermined values thereof.

3. The apparatus as set forth in claim 2 wherein said predetermined reference signal has a value of twice the value of the sine signal at substantially the plus and minus 45° position of said sine winding relative to said stator winding.

4. The apparatus as set forth in claim 1 wherein said sine winding signal comprises an a.c. carrier modulated in accordance with the angular position of said sine winding relative to said stator winding and said means responsive thereto includes a first demodulator means for converting said modulated sine signal to a d.c. output signal proportional thereto between said first and second predetermined values thereof, said predetermined constant reference signal is a d.c. signal, said cosine winding signal comprises an a.c. carrier modulated in accordance with the angular position of said cosine winding relative to said stator winding and said means responsive to said a.c. cosine signal and said d.c. reference signal includes a second demodulator means for converting said combined reference signal and said cosine signal to a d.c. output signal proportional thereto for values of said cosine signal in excess of said first and second predetermined values of said sine signal, and means responsive to said sine and cosine winding signals for supplying a.c. reference signals for said first and second demodulator means.

5. The apparatus as set forth in claim 1 further comprising, output signal means, and first detector means responsive to at least one of said sine and cosine winding signals for supplying said first output signal to said output signal means for values of said sine signal between said first and second predetermined values thereof and for supplying said second output signal to said output signal means for values of said sine signal in excess of said first and second predetermined values thereof.

6. The apparatus as set forth in claim 5 wherein said detector means is responsive to the difference between the absolute value of said sine and cosine winding signals.

7. The apparatus as set forth in claim 2 wherein of first portion of said resultant second output signal is proportional to said constant reference signal minus the value of said cosine winding signal, and wherein a second portion of said resultant second output signal is proportional to said constant reference signal plus the value of said cosine winding signal.

8. The apparatus as set forth in claim 6 wherein said first and second predetermined values of said one winding signal corresponds to a rotor position of minus 45° to plus 45°, and further including, second detector means responsive to at least one of said sine and cosine winding signals for reversing the polarity of said predetermined constant reference at substantially the 0° rotor position of said one winding.

9. The apparatus as set forth in claim 8 further including third detector means responsive to said one winding signal for inhibiting the operation of said first detector means upon the value of said winding signal exceeding a third predetermined value.

10. The apparatus as set forth in claim 4 further including output signal means responsive to said d.c. output signals, and first detector means responsive to at least one of said sine and cosine winding signals for supplying said a.c. reference signal to said first demodulator means and inhibiting the supply of said a.c. reference signal to said second demodulator means for values of said one winding signal between said first and second predetermined value of said sine signal for supplying said a.c. reference signal to said second demodulator means and inhibiting the supply of said a.c. reference signal to said first demodulator means for values of said one winding signal in excess of said first and second predetermined values.

11. The apparatus as set forth in claim 10 wherein said constant reference signal is a reversible polarity d.c. signal and wherein said first and second predetermined values of said one winding signal corresponds to a rotor position of minus 45° and plus 45°, and further including second detector means responsive to at least one of said sine and cosine winding signals for reversing the polarity of said constant reference signals at substantially the 0° position of said one winding.

12. The apparatus as set forth in claim 1 wherein said predetermined constant reference signal represents the constant $\pm 1.414$ and wherein said resultant second output signal is proportional to $\pm 1.414 \mp (\cos \theta)$ where $\theta$ is the angular position of said sine winding relative to said stator winding.

* * * * *